United States Patent
Brodu et al.

(10) Patent No.: US 11,594,932 B2
(45) Date of Patent: Feb. 28, 2023

(54) COIL SUPPORT FOR ELECTRIC MOTOR

(71) Applicant: ETEL S.A., Motiers (CH)

(72) Inventors: Alexandre Brodu, Neuchatel (CH); Adrien Aymon, Neuchatel (CH)

(73) Assignee: ETEL S.A., Motiers (CH)

( * ) Notice: Subject to any disclaimer, the term of this patent is extended or adjusted under 35 U.S.C. 154(b) by 261 days.

(21) Appl. No.: 16/995,827

(22) Filed: Aug. 18, 2020

(65) Prior Publication Data

US 2021/0057954 A1  Feb. 25, 2021

(30) Foreign Application Priority Data

Aug. 20, 2019 (EP) .................................... 19192643

(51) Int. Cl.
*H02K 5/04* (2006.01)
*H02K 3/50* (2006.01)
*H01F 27/30* (2006.01)

(52) U.S. Cl.
CPC ............. *H02K 3/50* (2013.01); *H01F 27/306* (2013.01); *H02K 5/04* (2013.01)

(58) Field of Classification Search
CPC .. H02K 5/04; H02K 3/50; H02K 3/47; H02K 3/52; H02K 41/03; H02K 3/26; H02K 1/27; H02K 21/24; H02K 7/14; H02K 1/182; H02K 9/24; H02K 9/00; H01F 27/306; H05K 1/165; H05K 3/0052; H05K 1/0298

See application file for complete search history.

(56) References Cited

U.S. PATENT DOCUMENTS

| 4,287,446 A | 9/1981 | Lill et al. |
| 5,783,877 A * | 7/1998 | Chitayat .................. H02K 9/24 310/12.33 |
| 2003/0025403 A1* | 2/2003 | Hsiao ..................... H02K 41/03 310/12.14 |

* cited by examiner

*Primary Examiner* — Ahmed Elnakib
*Assistant Examiner* — Leda T Pham
(74) *Attorney, Agent, or Firm* — Leydig, Voit & Mayer, Ltd.

(57) ABSTRACT

A coil support for an electric motor includes a coil holding arrangement having coil holding portions configured to hold a corresponding number of coils. A connectics receiving arrangement is configured as a housing for interconnected cables and coil wires. The connectics receiving arrangement comprises a cable receiving portion having recesses configured to receive the cables and a wire receiving portion having through-holes extending from a top surface to a bottom surface of the wire receiving portion. The top surface of the wire receiving portion is arranged adjacent the coil holding arrangement and the bottom surface of the wire receiving portion is located in the connectics receiving arrangement so as to provide for electrical interconnection of the coils with corresponding ones of the cables. A separation wall is arranged between the bottom surface of the wire receiving portion and the coil holding arrangement.

16 Claims, 4 Drawing Sheets

COIL SUPPORT FOR ELECTRIC MOTOR

CROSS-REFERENCE TO PRIOR APPLICATION

Priority is claimed to European Patent Application No. EP 19192643.5, filed on Aug. 20, 2019, the entire disclosure of which is hereby incorporated by reference herein.

FIELD

The present invention relates to a coil support for electric motor, a coil assembly comprising the coil support and coils mounted thereon and an electrical motor, in particular a linear or a rotary ironless motor, comprising the coil assembly.

BACKGROUND

The performance of electric motors is affected by coil positioning. Accurate positioning of the coils relative to each other and with respect to the coil support is therefore of the utmost importance. In addition, the input and output wires of the coils need to be connected to cables in order to supply the coils with current. For electric motors of small size, the difficulty for the operator is to connect the input and output wires of the coils with the corresponding cables and to cram all wires and cables inside a very limited space.

After all the components (coil support, coils, cable and sensors if needed) have been assembled and all electrical connections have been performed, the assembly is potted in a specially adapted leak-tight enclosure, so-called potting mould as shown in FIG. 8. The potting operation is a sensitive procedure as the operator must ensure that all wires and cables are confined and remain in a particular area to prevent any damages to the cables and wires when the potting mould is closed for injection of synthetic resin, such as epoxy.

Moreover, regulatory standards require minimum creepage distance along the surface of a solid insulating material between two conductive parts for security reasons which may be difficult to achieve inside a very limited space.

The problem of accurate coil positioning has already been addressed for optimizing the overall performance of electric motors. For example, U.S. Pat. No. 5,783,877 discloses a coil support for ironless linear motors, comprising a ceramic substrate having a recessed surface from which raised portions extend into the central opening of the coils. A base portion has a contour into which lower portions of the coils extend. The raised portions and contours are dimensioned so as to provide a close fit with the coils.

SUMMARY

In an embodiment, the present invention provides a coil support for an electric motor. The coil support includes a coil holding arrangement having a plurality of coil holding portions configured to hold a corresponding plurality of coils. A connectics receiving arrangement is configured as a housing for interconnected cables and coil wires. The connectics receiving arrangement comprises a cable receiving portion having a plurality of recesses configured to receive the cables and a wire receiving portion having a plurality of through-holes extending from a top surface to a bottom surface of the wire receiving portion. The top surface of the wire receiving portion is arranged adjacent the coil holding arrangement and the bottom surface of the wire receiving portion is located in the connectics receiving arrangement so as to provide for electrical interconnection of the coils with corresponding ones of the cables. A separation wall is arranged between the bottom surface of the wire receiving portion and the coil holding arrangement.

BRIEF DESCRIPTION OF THE DRAWINGS

Embodiments of the present invention will be described in even greater detail below based on the exemplary figures. The present invention is not limited to the exemplary embodiments. All features described and/or illustrated herein can be used alone or combined in different combinations in embodiments of the present invention. The features and advantages of various embodiments of the present invention will become apparent by reading the following detailed description with reference to the attached drawings which illustrate the following.

DETAILED DESCRIPTION

Figure 1:
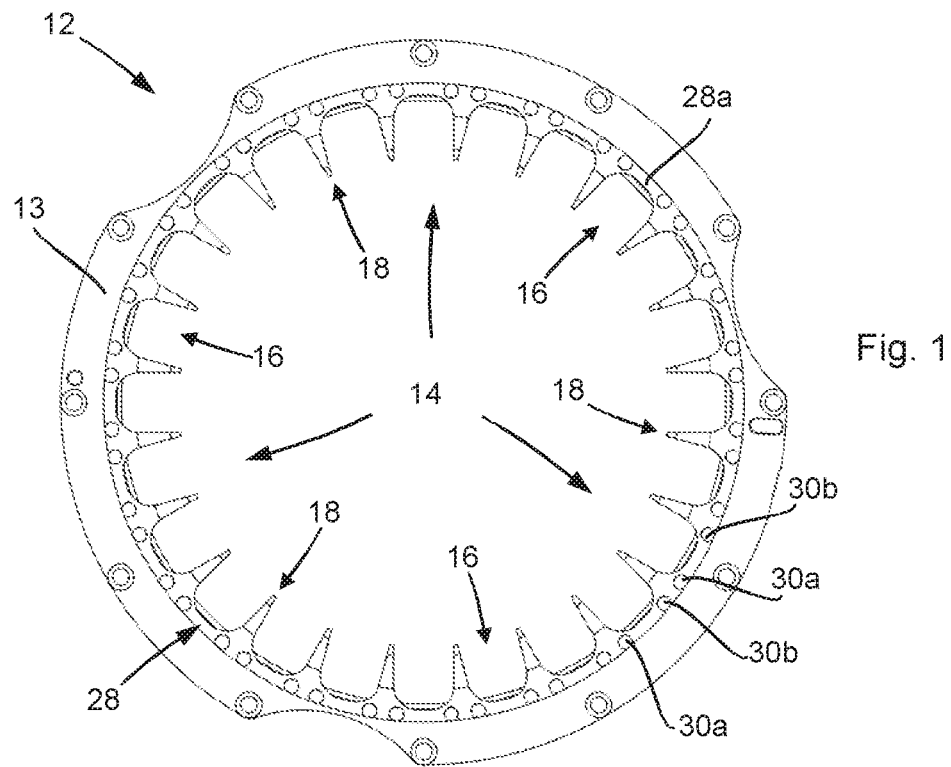
FIG. 1 shows a top view of a coil support for electric rotary motor according to an embodiment of the invention.
Figure 2:
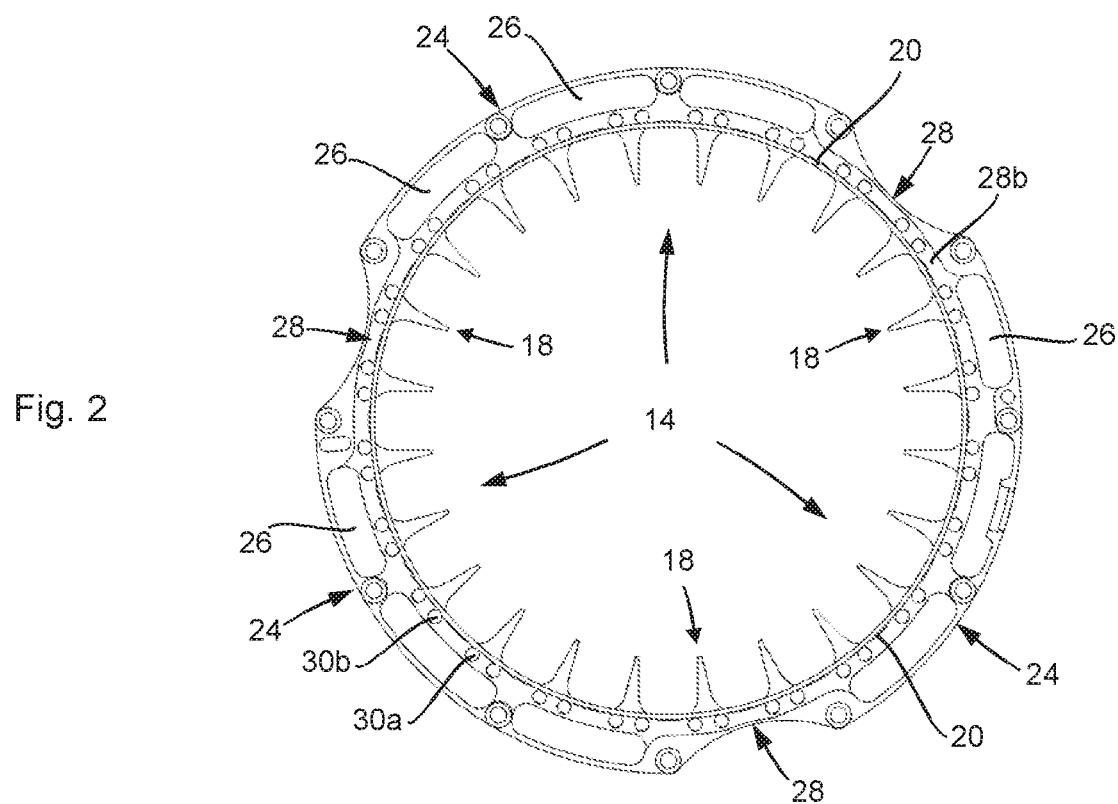
FIG. 2 shows a bottom view of the coil support of FIG. 1.

Embodiments of the present invention provide an alternative coil support adapted to optimize the positioning of the coils and which addresses the aforementioned problems.

More particularly, embodiments of the present invention provide a coil support for accurate coil positioning and adapted to simplify the wiring interconnection between the input and output wires of the coils and the cables.

Embodiments of the present invention provide a coil support adapted to hold cables as well as input and output wires of the coils adequately to avoid damages to the cables and wires during the potting operation.

The foregoing advantages are achieved according to an embodiment of the present invention by a coil support for electric motor, comprising a coil holding arrangement having a plurality of coil holding portions configured to hold a corresponding plurality of coils, and a connectics receiving arrangement for housing interconnected cables and coil wires. The connectics receiving arrangement comprises a cable receiving portion having a plurality of recesses for housing cables and a wire receiving portion having a plurality of through-holes extending from a top surface to a bottom surface of the wire receiving portion. The top surface of the wire receiving portion is arranged adjacent the coil holding arrangement while the bottom surface of said wire receiving portion is located in the connectics receiving arrangement for electrical interconnection of the coils with the corresponding cables. The coil support further comprises a separation wall arranged between the bottom surface of the wire receiving portion and the coil holding arrangement.

In an embodiment, the separation wall extends perpendicularly downwardly from an interface region between the bottom surface of the wire receiving portion and the coil holding arrangement.

In an embodiment, the height of the separation wall is above 5 mm, preferably above 6 mm.

In an embodiment, the thickness of the wall is at least 0.8 mm and preferably at least 1 mm and is made of insulating material.

In an embodiment, the coil holding arrangement comprises a plurality of projecting portions extending from one side of the wire receiving portion. The projecting portions are spaced apart regularly from each other to form therebetween the plurality of coil holding portions.

In an embodiment, each projecting portion comprises a linear surface on two opposite lateral sides of said projecting portion. The two opposite lateral sides of each projecting portion converge towards one another to form an apex at a distal end of said projecting portion.

In an embodiment, each projecting portion further comprises a curved surface on the two opposite lateral sides of each projecting portion. Both curved surfaces extend from one side of the wire receiving portion to respective linear flat surface of each projecting portion.

In an embodiment, the coil support is adapted for electric rotary motor. The separation wall has a cylindrical shape. Each of said plurality of projecting portions extend radially inwardly from an inner side of a wire annular receiving portion such that any of two adjacent projecting portions comprise each a linear surface facing each other against which lateral sides of a coil may be fixed.

In an embodiment, portions of the inner side of the wire annular receiving portion provides a contacting surface in each of the coil holding portion between two curved surface of adjacent projecting portions. An additional side of the coil may be fixed against said contacting surface.

In an embodiment, the connectics receiving arrangement comprises an annular cable receiving portion comprising arcuate recesses spaced apart from each other through 360°.

In an embodiment, a pair of through-holes of said plurality of through-holes is arranged on the wire annular receiving portion in correspondence with each coil holding portion for electrical connection of the input and output wires of the corresponding coil with the corresponding cables.

In an embodiment, the through-holes of each pair are arranged near both sides of the corresponding coil.

Another embodiment of the invention provides a coil assembly comprising the coil support according to an embodiment of the invention and a plurality of coils fixed in their respective coil holding portion.

Another embodiment of the invention provides an electric rotary or linear motor comprising the coil assembly.

With reference to FIGS. 1 to 4, the coil support 12 is configured to facilitate the potting operation of the coil assembly 10, once the interconnection between cables and wire inputs and outputs of all the coils 40 have been performed, in order to provide a stator for an electric rotary motor.

In this respect, the coil support 12 comprises a coil holding arrangement 14 for mounting a plurality of coils 40 and a connectics receiving arrangement 22 for housing interconnected cables and coil wires. A lower edge 22a of the connectics receiving arrangement 22 is configured to be fixedly mounted on a mounting surface to form a casing 13. In this respect, the inner side of the casing 13 comprises several bulges 13a comprises each a through-hole 13b extending from a top side to a bottom side of the coil support 12 for securing the support 12 to the mounting surface by means of screws.

The connectics receiving arrangement 22 comprises a cable receiving portion 24 arranged around a wire receiving portion 28 having an annular shape. The cable receiving portion 24 is provided with a plurality of recesses for housing cables, for example arcuate recesses 26. These recesses 26 are spaced apart from each other through 360°. The wire annular receiving portion 28 is provided with a plurality of through-holes 30a, 30b spaced apart from each other through 360° and extending from a top annular surface 28a to a bottom annular surface 28b of the wire annular receiving portion 28. The top annular surface 28a is arranged adjacent the coil holding arrangement 14 while the bottom annular surface 28b is part of the connectics receiving arrangement 22 for electrical interconnection of the coils 40 with the corresponding cables.

Figure 7:
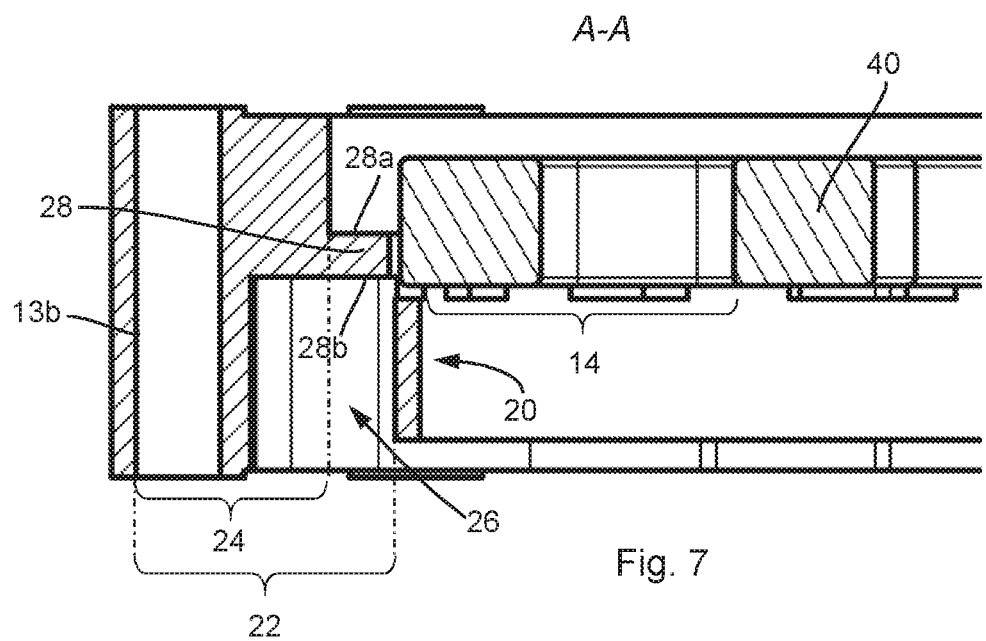
FIG. 7 shows a cross-sectional view of FIG. 6 taken along the line A-A.
Figure 8:
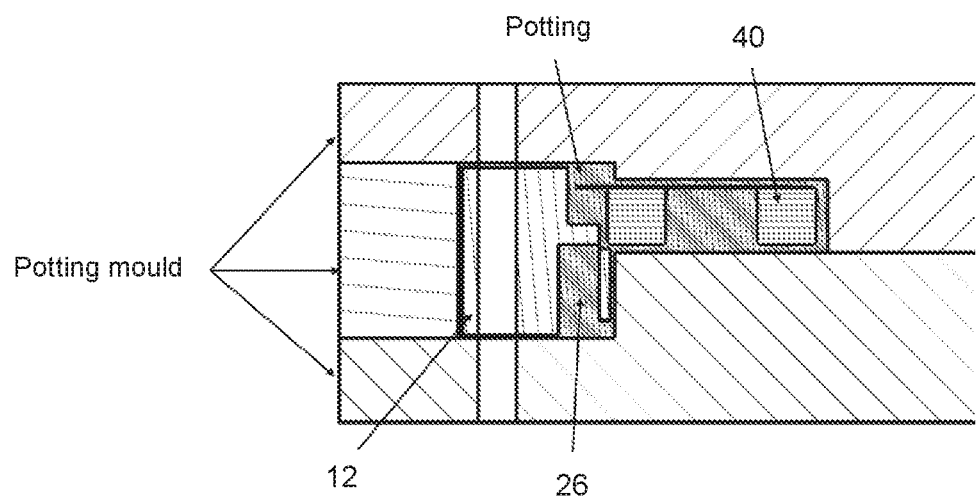
FIG. 8 shows a partial cross-sectional view of the coil assembly of FIG. 6 inside a potting mould.

As shown particularly in FIG. 7, a separation cylindrical wall 20 is arranged between the bottom annular surface 28b of the wire annular receiving portion 28 and the coil holding arrangement 14. More particularly, the separation cylindrical wall 20 extends perpendicularly downwardly from an interface region between the coil holding arrangement 14 and the bottom annular surface 28b of the wire annular receiving portion 28. The height of the separation cylindrical wall 20 is above 5 mm and preferably between 6 and 7 mm while its thickness is approximately 1 mm. In an advantageous embodiment, the wall 20 is made of insulating material, such as plastic, in order to increase the creepage distance to protect the cable interconnections from accessible surfaces.

Referring to FIG. 1, the coil holding arrangement 14 comprises a plurality of projecting portions 18 extending radially inwardly from an inner cylindrical side of the wire annular receiving portion 28. The projecting portions 18 are regularly spaced apart from each other to form therebetween a plurality of coil holding portions 16. The plurality of through-holes 30a, 30b are grouped by pair, each of which being arranged on the wire annular receiving portion 28 in correspondence with each coil holding portion 16 for electrical connection.

Figure 3:
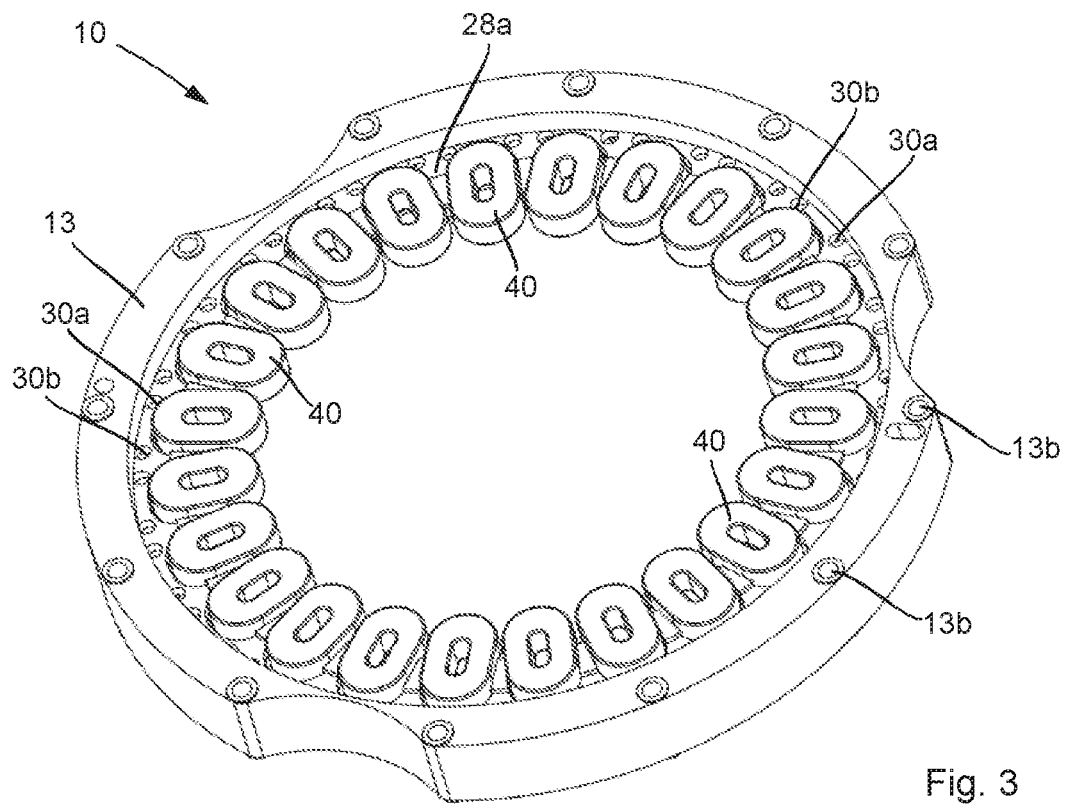
FIG. 3 shows a perspective top view of a coil assembly comprising the coil support of FIG. 1 and coils mounted thereon.
Figure 4:
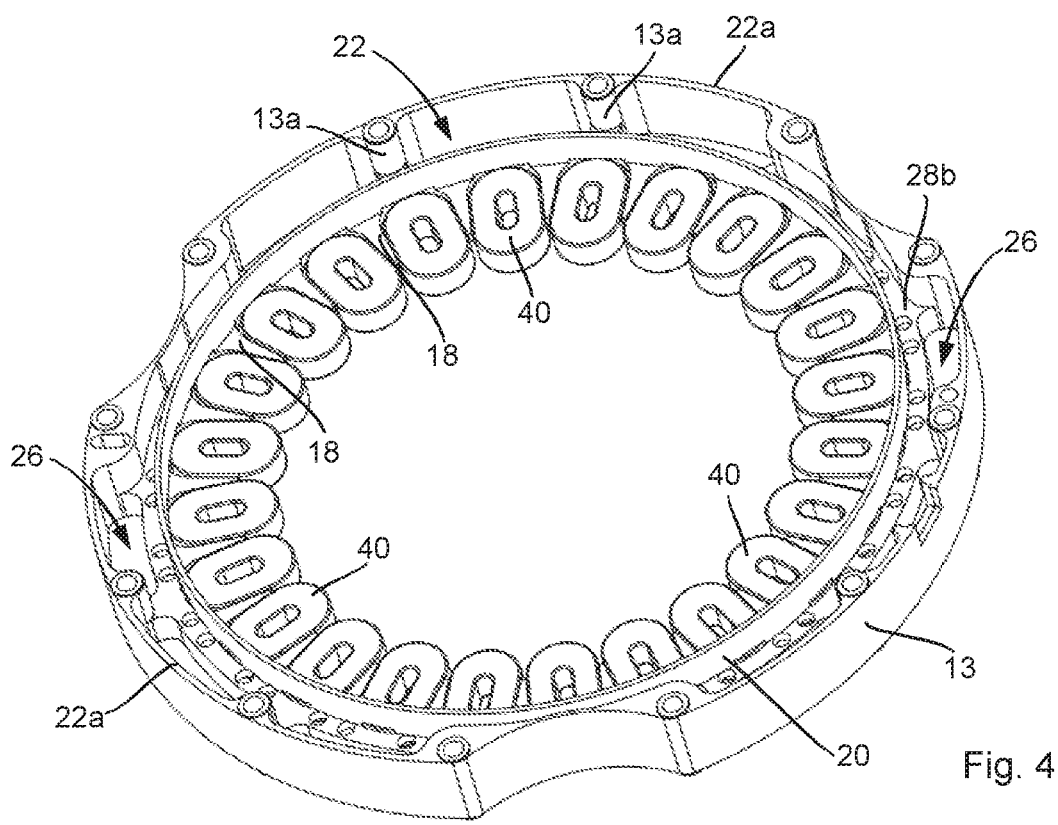
FIG. 4 shows a perspective bottom view of the coil assembly of FIG. 3.

More particularly, with reference to FIG. 3, each pair of through-holes 30a, 30b comprises an input through-hole 30a for connecting the wire input of a coil 40 to a corresponding cable and an output through-hole 30b for connecting the wire output of the coil 40 to another corresponding cable. Input and output through-holes 30a, 30b are arranged on the wire annular receiving portion 28 near both sides of each coil 40.

Figure 5:
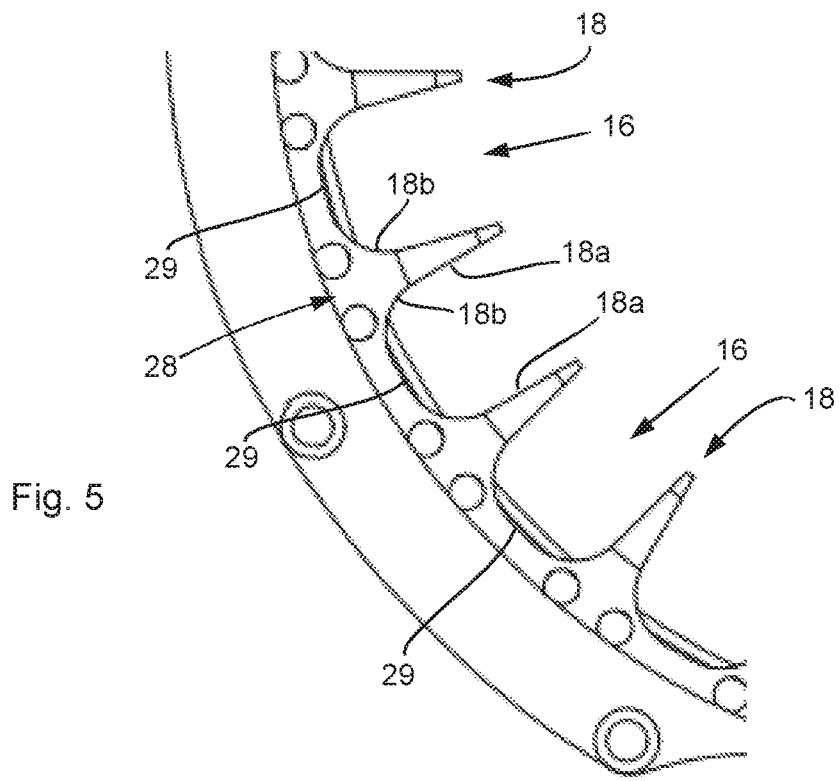
FIG. 5 shows a partial view of FIG. 1.
Figure 6:
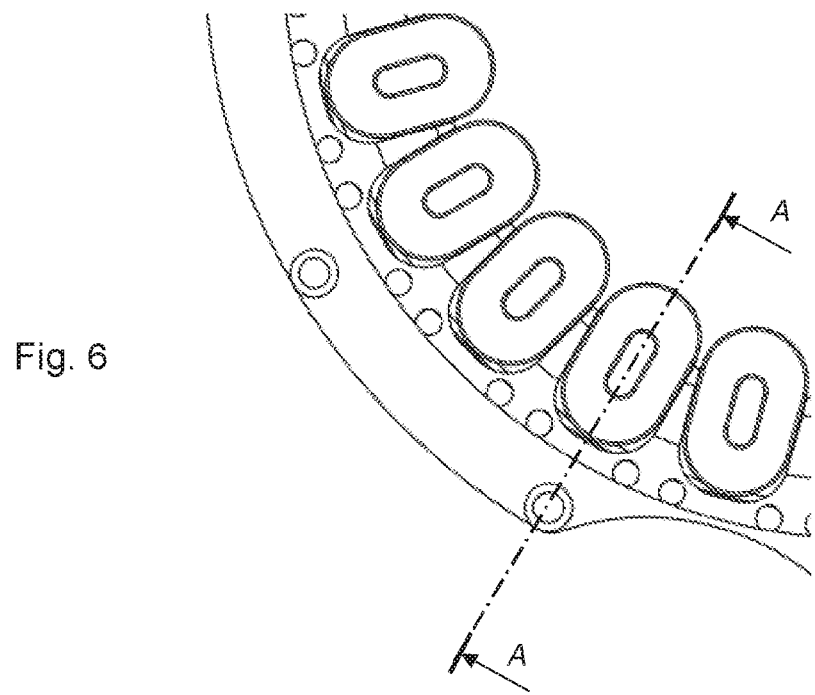
FIG. 6 shows a partial top view of FIG. 3.

As shown in FIG. 5, each projecting portion 18 comprises on two opposite lateral sides a linear flat surface 18a. The two opposite lateral sides of each projecting portion 18 converge towards one another to form an apex at a distal end of the projecting portion 18. Two symmetric curved surface 18b extend from the annular cylindrical side of the wire annular receiving portion 28 to respective flat surface 18a on both opposite sides of the projecting portion 18. Any of two adjacent projecting portions 18 comprise each a flat surface 18a facing each other and against which lateral sides of a coil may be fixed.

Portions 29 of the inner side of the wire annular receiving portion 28 provides an additional contacting surface in each of the coil holding portion 16 between two curved surface 18b of adjacent projecting portions 18. Accordingly, each coil holding portion 16 comprises three contacting surfaces. The corresponding part of the respective coil 40 may therefore be glued against these contacting surfaces, thereby ensuring that the coils 40 are fixed and positioned accurately with respect to each other and to the coil support in order to optimize the overall performance of the electric rotary motor.

Once the coils 40 have been glued in their respective coil holding portion, the input and output wires of each coil 40 are threaded through the corresponding through-holes 30a, 30b to guide their respective end portion into the connectics receiving arrangement 22. The coil support 12 is then turned upside down for the interconnection of the cables with the coil wires. The interconnection operation is rather straightforward since the operator could readily differentiate the input wire from the output wire of each coil 40 from the distance between each pair of through-holes.

Once the cables and wires interconnection have been performed, the cables are crammed into their corresponding arcuate recesses 26. The separation cylindrical wall 20 advantageously ensures that all the cables and wires are confined and remain into the connectics receiving arrangement such that the potting operation may be performed without any risk of damaging the cables when the potting mould is closed.

Although, the coil support as described above is intended for an electric rotary motor, the coil support may however be adapted for an electric linear motor without departing from the scope of the appended claims. In that case, a linear track comprises a first and a second linear coil support opposite each other. Each coil support comprises a linear coil holding arrangement and an adjacent linear connectics receiving arrangement. The connectics receiving arrangement comprises a cable receiving portion with a plurality of elongated recesses along the linear track and a wire receiving portion adjacent the cable receiving portion and comprising thoughholes at different intervals along the track. A linear separation wall is arranged between a bottom surface of the wire receiving portion and the coil holding arrangement.

While embodiments of the invention have been illustrated and described in detail in the drawings and foregoing description, such illustration and description are to be considered illustrative or exemplary and not restrictive. It will be understood that changes and modifications may be made by those of ordinary skill within the scope of the following claims. In particular, the present invention covers further embodiments with any combination of features from different embodiments described above and below. Additionally, statements made herein characterizing the invention refer to an embodiment of the invention and not necessarily all embodiments.

The terms used in the claims should be construed to have the broadest reasonable interpretation consistent with the foregoing description. For example, the use of the article "a" or "the" in introducing an element should not be interpreted as being exclusive of a plurality of elements. Likewise, the recitation of "or" should be interpreted as being inclusive, such that the recitation of "A or B" is not exclusive of "A and B," unless it is clear from the context or the foregoing description that only one of A and B is intended. Further, the recitation of "at least one of A, B and C" should be interpreted as one or more of a group of elements consisting of A, B and C, and should not be interpreted as requiring at least one of each of the listed elements A, B and C, regardless of whether A, B and C are related as categories or otherwise. Moreover, the recitation of "A, B and/or C" or "at least one of A, B or C" should be interpreted as including any singular entity from the listed elements, e.g., A, any subset from the listed elements, e.g., A and B, or the entire list of elements A, B and C.

REFERENCE LIST

Coil assembly 10 for electric motor
Coil support 12
Casing 13
Bulges 13a
Threaded-through holes 13b
Coil holding arrangement 14
Coil holding portions 16
Projecting portions 18
Linear part 18a
Curved part 18b
Separation wall 20
Connectics receiving arrangement 22
Lower edge 22a
Cable receiving portion 24
Arcuate recesses 26
Wire receiving portion 28
Annular top surface 28a
Annular bottom surface 28b
Coil contacting surface 29
Through-holes
Input through-hole 30a
Output through-hole 30b
Coils 40

What is claimed is:

1. A coil support for an electric motor, the coil support comprising:
a coil holding arrangement having a plurality of coil holding portions configured to hold a corresponding plurality of coils;
a connectics receiving arrangement configured as a housing, the connectics receiving arrangement comprising a cable receiving portion having a plurality of recesses configured to receive cables and a wire receiving portion having a plurality of through-holes extending from a top surface to a bottom surface of the wire receiving portion, wherein the top surface of the wire receiving portion is arranged adjacent the coil holding arrangement and wherein the bottom surface of the wire receiving portion is located in the connectics receiving arrangement to provide electrical interconnection of the coils with corresponding ones of the cables; and
a separation wall arranged between the bottom surface of the wire receiving portion and the coil holding arrangement.

2. The coil support according to claim 1, wherein the separation wall extends perpendicularly downwardly from an interface region between the bottom surface of the wire receiving portion and the coil holding arrangement.

3. The coil support according to claim 2, wherein a height of the separation wall is greater than 5 mm.

4. The coil support according to claim 3, wherein the height of the separation wall is greater than 6 mm.

5. The coil support according to claim 1, wherein the coil holding arrangement comprises a plurality of projecting portions extending from one side of the wire receiving portion, the plurality of projecting portions being spaced apart regularly from each other to form therebetween the plurality of coil holding portions.

6. The coil support according to claim 5, wherein each of the plurality of projecting portions have two opposite lateral sides, each of the lateral sides comprising a linear surface, and the two opposite lateral sides of each respective one of the plurality of projecting portions converging towards one another to form an apex at a distal end of the respective projecting portion.

7. The coil support according to claim 6, wherein each of the plurality of projecting portions further comprises a curved surface on the two opposite lateral sides, the curved surface extending in each case from one side of the wire receiving portion to a respective one of the linear flat surfaces of the respective projecting portion.

8. The coil support according to claim 5, being configured for an electric rotary motor, wherein the separation wall has a cylindrical shape and the wire receiving portion is annular, and wherein each of the plurality of projecting portions extends radially inwardly from an inner side of the wire receiving portion such that any of two adjacent ones of the projecting portions comprise a pair of the linear surfaces facing each other against which lateral sides of a coil are fixable in position.

9. The coil support according to claim 8, wherein portions of the inner side of the wire receiving portion each provide a contacting surface in a respective one of the coil holding portions between a pair of the curved surfaces of adjacent ones of the projecting portions which are adjacent to the respective coil holding portion, and wherein an additional side of the coil is fixable in position against the contacting surface.

10. The coil support according to claim 8, wherein the connectics receiving arrangement comprises an annular cable receiving portion comprising arcuate recesses spaced apart from each other through 360°.

11. The coil support according to claim 10, wherein a pair of through-holes of the plurality of through-holes is arranged on the annular cable receiving portion in correspondence with each coil holding portion for electrical connection of input and output wires of each of the coils with the corresponding cables.

12. The coil support according to claim 1, wherein the through-holes of each pair of the through-holes are arranged near both sides of a corresponding one of the coils.

13. A coil assembly comprising the coil support according to claim 1 and a plurality of coils fixed in respective ones of the coil holding portions.

14. An electric motor comprising the coil support according to claim 1 and a plurality of coils fixed in respective ones of the coil holding portions.

15. The electric motor according to claim 14, wherein the electric motor is a linear electric motor.

16. The electric motor according to claim 14, wherein the electric motor is a rotary electric motor.

* * * * *